United States Patent [19]

Calvin

[11] 4,174,257

[45] Nov. 13, 1979

[54] HYDRAULIC HOLD-DOWN FOR NUCLEAR REACTOR FUEL

[75] Inventor: John N. Calvin, West Simsbury, Conn.

[73] Assignee: Combustion Engineering, Inc., Windsor, Conn.

[21] Appl. No.: 911,602

[22] Filed: Jun. 1, 1978

Related U.S. Application Data

[63] Continuation of Ser. No. 784,189, Apr. 4, 1977.

[51] Int. Cl.² .............................................. G21C 15/00
[52] U.S. Cl. ........................................ 176/50; 176/61
[58] Field of Search ................... 176/50, 61, 87, 36 R, 176/86 R, 38, 78

[56] References Cited

U.S. PATENT DOCUMENTS

| | | | |
|---|---|---|---|
| 3,235,465 | 2/1966 | McDaniel et al. | 176/61 |
| 3,383,287 | 5/1968 | Jackson | 176/50 |
| 3,549,493 | 12/1970 | Germer | 176/50 |
| 3,736,226 | 5/1973 | Sakurama | 176/50 |
| 3,853,703 | 12/1974 | Anthony et al. | 176/50 |
| 3,888,731 | 6/1975 | Finch et al. | 176/50 |

*Primary Examiner*—Harvey E. Behrend
*Attorney, Agent, or Firm*—Edward L. Kochey, Jr.

[57] ABSTRACT

A fuel assembly for a nuclear reactor has a pressure plate attached to the lower end thereof. The upper side of the pressure plate is exposed to the ambient pressure of the reactor coolant. The lower side of the pressure plate is exposed to a pressure from another location in the reactor, selected so that the pressure above the pressure plate is greater than that below the pressure plate.

2 Claims, 2 Drawing Figures

HYDRAULIC HOLD-DOWN FOR NUCLEAR REACTOR FUEL

This application is a continuation application of U.S. Application Ser. No. 784,189 filed Apr. 4, 1977.

BACKGROUND OF THE INVENTION

This invention relates to nuclear reactors and in particular to an apparatus for holding down fuel assemblies within the reactor core.

In pressurized water reactors the coolant flow rate and fuel assembly flow resistance are such that the hydraulic uplift force is of sufficient magnitude to cause the assemblies to jitter and even lift off the core support structure. Various approaches have been used to eliminate this detrimental movement.

One suggested solution involves the use of a lock down device which attaches the lower end of the fuel assemblies to the core support structure. While this device will function properly, it does introduce mechanical complexity since the device must not only lock and unlock remotely, but it must release reliably after a year of operation in the reactor environment.

Another approach has been to use springs located above each fuel assembly which bear against an upper alignment plate, thereby urging the fuel assemblies down. As reactors have been designed with increasingly large hydraulic uplift forces the spring force has become very large. The springs themselves have become so large that an excessively large plenum is required between the alignment plate and the upper end fitting of the fuel assembly. The springs at this location produce an undesirable flow pattern and an excessively high pressure drop through the plenum. They are also potentially subject to flow induced vibration since the total reactor coolant passes over these springs.

SUMMARY OF THE INVENTION

It is an object of the invention to hold-down fuel assemblies in a simple uncomplicated manner which will eliminate or reduce the need for spring hold-down forces. It is a further object to introduce these forces in a manner which will compensate for variations in primary flow through the reactor.

These and other objects are achieved in the invention by attaching to the fuel assembly, at the lower end, a pressure plate. The pressure plate is horizontally coextensive with the fuel assembly and has upper side of the plate exposed to the reactor fluid pressure existing in that area. The lower side of the pressure plate is exposed to a pressure from another location in the reactor vessel. The pressures are selected so that the higher pressure is always above the pressure plate, thereby resulting in a downward force on the fuel assembly. The low pressure is obtained by connecting this area to a portion of the fluid flow path near the outlet from the reactor.

A pressurizable plenum is formed below the sealing plate by providing a sealing arrangement between extensions on the sealing plate and an alignment plate which is adjacent thereto. Spring means to supplement the hold-down force may be used since they are compatible with the hydraulic structure and they may be of lesser magnitude than the prior art structure where the spring means supplied the entire hold-down force.

Various other objects and advantages will appear from the following description of the embodiments of the invention, and the novel features will be particularly pointed out in connection with the appended claims.

DESCRIPTION OF THE PREFERRED EMBODIMENT

Figure 1:
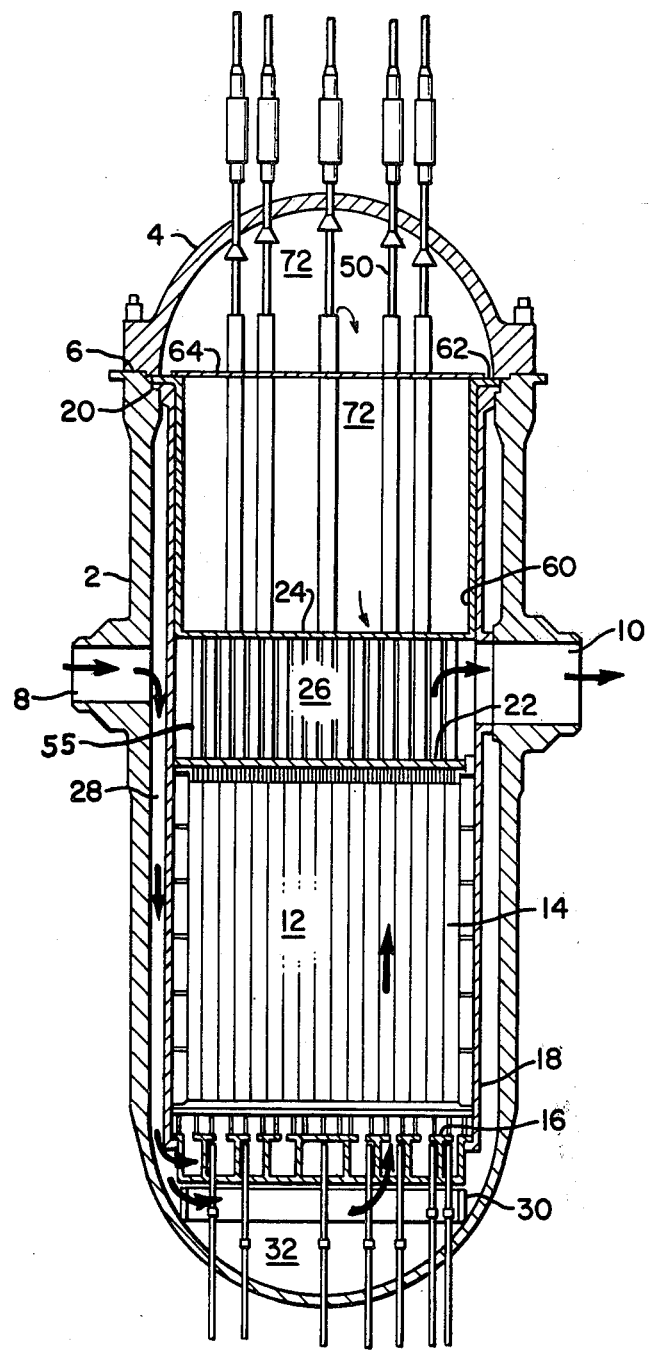
FIG. 1 is a sectional elevation of a general arrangement of a nuclear reactor which illustrates the general structure and the flow paths therethrough.

A reactor vessel body 2 and a reactor vessel head 4 are joined by bolted connection at flange 6. The reactor vessel body has an inlet opening 8 and an outlet opening 10 for flow of coolant water therethrough.

A core 12 is comprised of a plurality of fuel assemblies 14, each of which is comprised of a plurality of elongated fuel rods. The core is supported on the core support assembly 16 which is in turn supported by the core support barrel 18. This core support barrel is supported by flange 20 from the reactor vessel body 2 at a location adjacent the flange 6.

Immediately above the core 12 is a fuel assembly alignment and seal plate 22 which serves to engage the upper ends of the fuel assemblies and to maintain alignment thereof. A boundary plate structure 24 is located above the alignment plate, thereby defining the outlet plenum 26.

After the coolant enters through inlet opening 8 the flow passes downwardly through the annular space 28 between the reactor vessel and the core support barrel. This flow passes downwardly through the flow skirt 30 into an inlet plenum 32 located below the core 12. The flow passes upwardly through the core and through openings 52 in the alignment plate 22 into the outlet plenum 26. From here the flow passes out through outlet opening 10 to a steam generator (not shown).

Each of the fuel assemblies 14 contain within their structure four control rod guide tubes 40 which pass through the entire length of the fuel assembly.

Finger shaped control rods 48 are vertically movable within the guide tubes 40 of the fuel assemblies. Each of these rods individually extends to an elevation above the foundary plate 24 at which location they may be joined in subgroupings to the control rod extension 50.

In addition to the flow holes 52, the alignment and seal plate 22 also has openings 54 through which the control rods pass. Control rod shroud tubes 56 pass through the outlet plenum 26 and may be welded to the alignment and seal plate 22 and the boundary plate structure 24. These shroud tubes surround and protect the control rods from the effects of cross flow through the plenum 26, and also are open to a chamber 72 above the boundary plate 24.

The boundary plate 24 is supported from barrel 60 which is supported by flanges 62 resting on flanges 20 of the core support barrel. The upper guide structure support plate 64 is open to permit flow therethrough.

The upper end of the control rod shroud tube 56 is open to the chamber 72 from which water passes by plate structure 24 to the outlet 10. Guide tubes 40 in the fuel assemblies are open at their upper end and therefore exposed to a low pressure existing near outlet 10.

Figure 2:
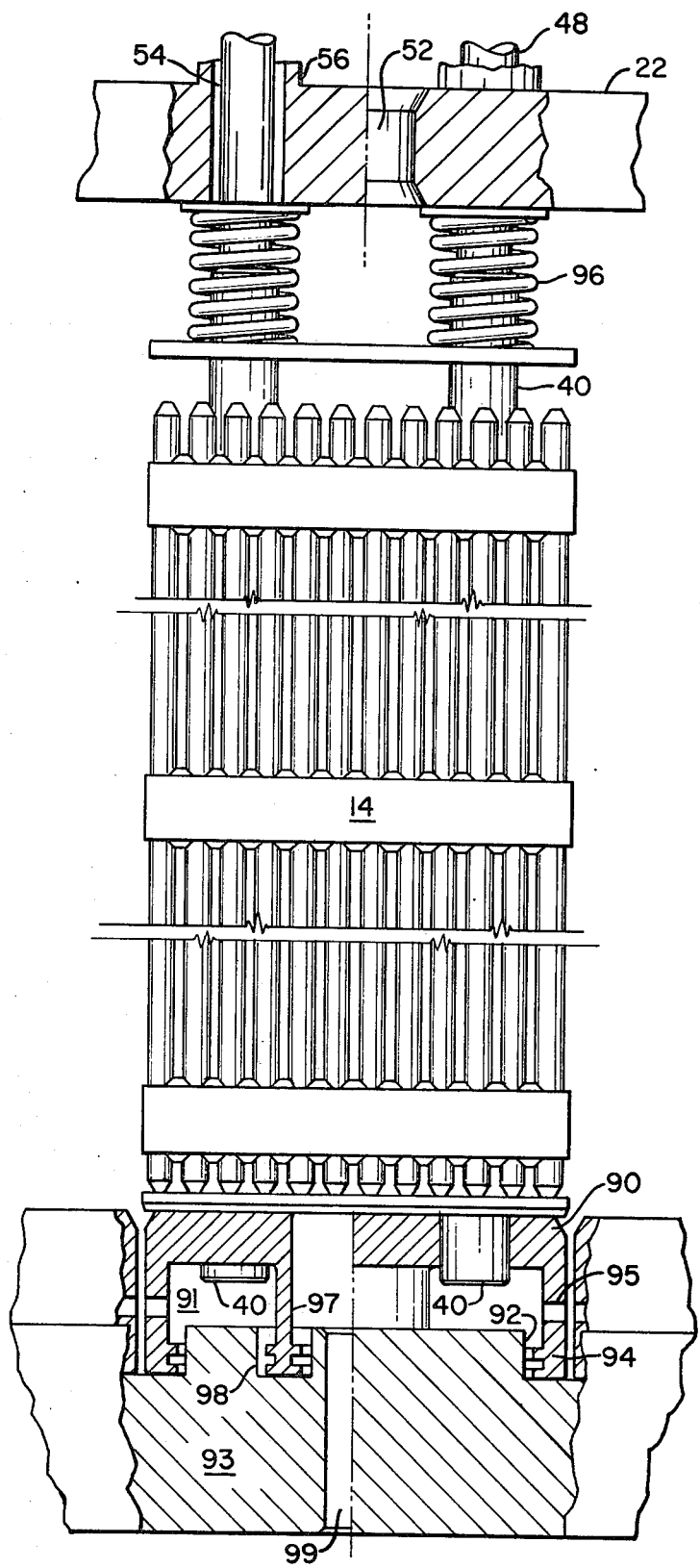
FIG. 2 is a sectional view illustrating a fuel assembly and the hydraulic hold-down therefore.

Referring to FIG. 2, the pressure at the top chamber of guide tubes 40 approximates the outlet pressure from the reactor. The control rod guide tubes 40 may be terminated just below the alignment and seal plate 22 as illustrated, or they may be continued upwardly into the top chamber 72. In either case, the tubes are open to a fluid pressure which approximate the outlet pressure from the reactor. The lower end of the guide tubes 40 extend through the seal plate 90 and are exposed to the pressurizable chamber 91. Slots 92 are provided in the core support structure 93 and the pressure plate 90 has downwardly extending lips 94 extending into slots in sealing relationship.

Since the main flow of coolant is upwardly across the fuel assemblies 14, the pressure at the lower end of the fuel assemblies is higher than the pressure at the upper end. This high inlet pressure operates on the upper surface of the pressure plate 90. Depending on the amount of flow past the seal, openings 95 may be provided through the seal plate structure, to permit additional flow to pass into chamber 91 and up through control rod guide tubes 40 in a total amount sufficient to cool the control rod fingers. A substantial amount of the flow restriction is provided in these openigns 95 so that the pressure in the pressurizable plenum 91 approximates that at the outlet of the control rod guide tubes. It follows that a low pressure exists below the seal plate 90 and a relatively high pressure exists above the seal plate. This pressure differential operates to hold-down the fuel assembly 14. Supplementary springs 96 may be provided between the upper portion of the fuel assembly and the alignment and seal plate 22.

A flow opening 99 may be provided as a flow path for the main coolant flow to the core. The low pressure chamber 91 is sealed around the periphery of the opening by downwardly extending lips 97 which engage the edges of slot 98 in the support and seal plate 93.

The uplift forces on the fuel assemblies are a function of the flow through the core. In this invention the hold-down force is also a function of the flow through the core, and therefore, the forces are self-compensating. This provides more tolerance in the event that flow or pressure drop varies form that predicted.

What is claimed is:

1. In a nuclear reactor having a pressure vessel and a core within the pressure vessel, said core comprised of a plurality of fuel assemblies each comprised of a plurality of vertically oriented fuel elements, the reactor having fluid under pressure passed upwardly over said fuel elements; the improvement comprising: a pressure plate attached to the lower end of a fuel assembly, and having an upper surface and a lower surface, said upper surface exposed to the fluid at the fuel assembly inlet; a sealing plate spaced below said pressure plate, portions of said seal plate peripherally engaged the outer portion of said pressure plate in closely spaced relationship for substantially restricting fluid flow therebetween, thereby forming a pressurizable plenum defined by the lower surface of said pressure plate and the upper surface of said seal plate; and a control rod guide tube extending vertically through said fuel assembly and said pressure plate, said control rod guide tube open to said pressure plenum at the lower end and open to the fluid flowing upwardly at the upper end of said fuel assemblies.

2. An apparatus as in claim 1 having also an alignment plate located above said fuel assembly, and a spring means located intermediate said alignment plate and said fuel assembly, and urging said fuel assembly downwardly away from said alignment plate.

* * * * *